Jan. 29, 1929.
F. X. LAUTERBUR
BEARING
Filed May 6, 1925
1,700,321
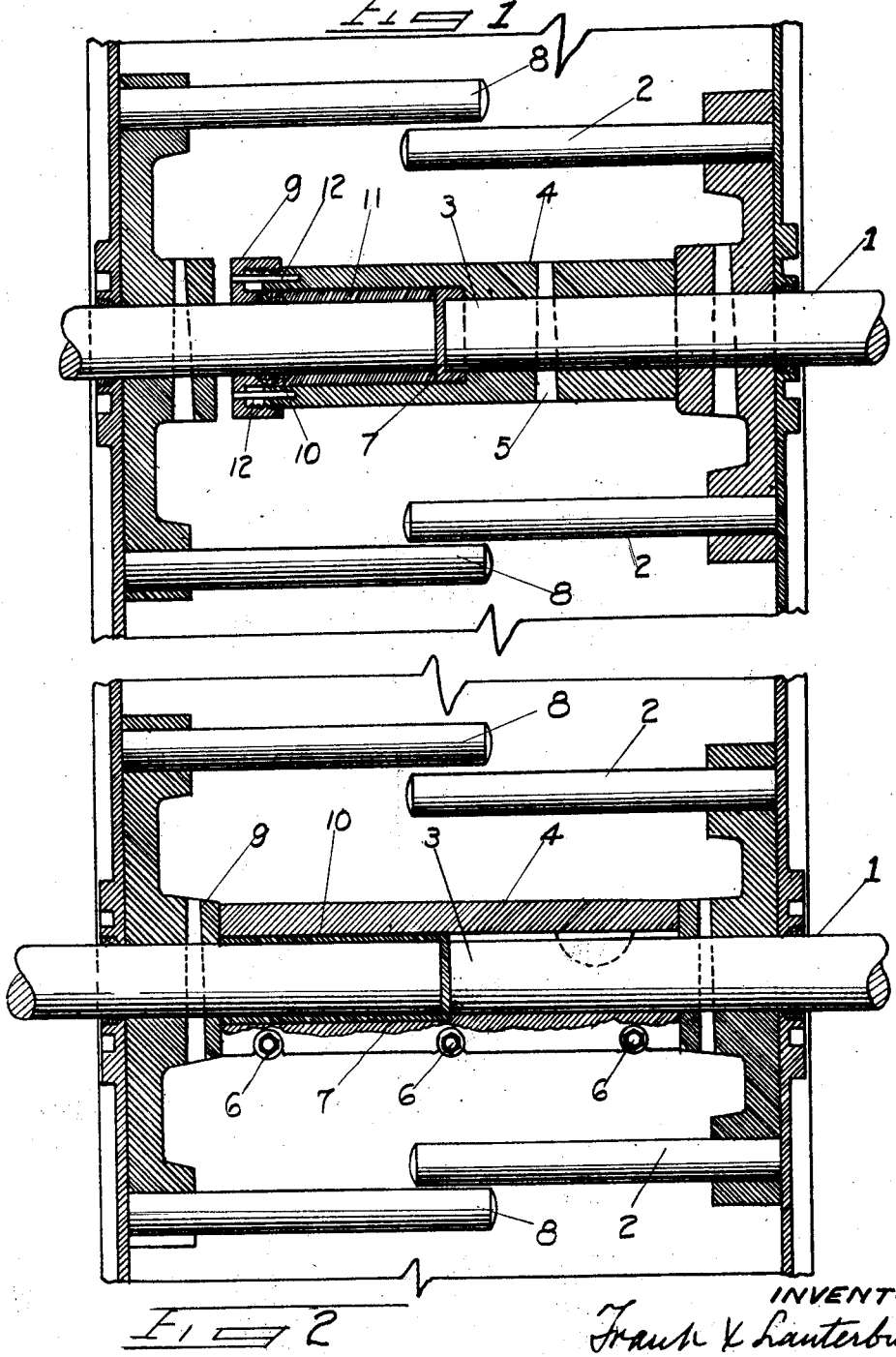

Patented Jan. 29, 1929.

1,700,321

UNITED STATES PATENT OFFICE.

FRANK X. LAUTERBUR, OF SIDNEY, OHIO.

BEARING.

Application filed May 6, 1925. Serial No. 28,471.

In mixing bowls it is frequently desirable to provide agitators which are operated at different speeds or at variable speeds. This is a distinct advantage in order to stretch the dough and develop the gluten when such agitators are driven at varying speeds.

With such constructions it has been found very difficult to keep the bearings in proper condition. These bearings have been heretofore supported outside of the bowl and consequently there is a tremendous twisting strain exerted against them causing undue wear and destroying the bearings.

It is the object therefore of my invention to provide for a plurality of shafts in alignment with each other carrying agitators to be driven at varying speeds, in which in addition to the main bearings outside the bowl, a bearing is provided for the shafts inside the mixing bowl, and in which provision is made for two modifications of the inner bearings within the bowl, one permanent and the other removable from the agitator shaft.

My invention therefore relates to that certain novel and useful construction to be hereinafter particularly pointed out and claimed, in which the above results are attained.

In the drawing in which I have illustrated several preferred embodiments of my invention, Figure 1 is a sectional view of a bearing made in accordance with my invention secured to one of the rotatable shafts with a pin.

Figure 2 is a sectional view of the same type of bearing secured to one of the shafts by a key engagement.

In the drawings generally indicated at 1 is a shaft on which an agitator of any desired type may be mounted. In order to clearly disclose the adaptation of my structure for use in a bread mixing machine, I have shown one type of bread mixing agitator arms 2, mounted on the shaft 1. This shaft is retained in a bearing in the casing of the mixing bowl, and any desired arrangement of gears or pulleys on the outside of the bowl is provided to rotate it at a predetermined speed. The shaft as noted does not extend through the casing opposite to the position in which it is introduced, but it is cut off as shown at 3. Mounted tightly on the shaft is a collar or sleeve bearing generally indicated at 4. This may be secured on the shaft 1 by means of a pin 5 as shown in Figure 1, or the sleeve may be split and stud bolts 6 as shown in Figure 2 may be used to securely fasten the sleeve to the shaft 1. Extending in continuation of the line in which the shaft 1 extends into the mixing bowl, is another shaft 7 on which the bread mixing agitator arms 8 are shown in position to cooperate with the paddles or agitator arms 2 mounted on the shaft 1. This shaft extends through the walls of the casing and is driven in any desired manner at any desired speed. The ends of the sleeve bearing 4 may be threaded and a lock nut 9 secured thereto, and packing indicated at 10 may be retained about the shaft 7 where it extends within the sleeve bearing and is supported therein. It is preferable to further provide a babbitted sleeve 11 enclosing the inner end of the shaft 7. Another method of securing the packing nut 9 in position is to secure the nut with studs 12 as shown in Figure 1.

When the split sleeve type of bearing shown in Figure 2 is employed, it may be extended so as to secure the packing nut 9 without any threads or studs as in the modification shown in Figure 1.

As noted in the foregoing description, it is not my purpose to specify necessary details for the support of the bearing other than the essential features which are for use in a mixing machine and comprise a bearing retained on one rotatable shaft, with an open end of the bearing enclosing another shaft which may be rotated independently of the first mentioned shaft. While I have shown a sleeve type bearing, an ordinary ball bearing could be supported in the same manner.

Having thus described my invention, what I claim as new and desire to secure by Letters Patent, is:—

1. In combination with a rotatable member attached to a rotatable shaft, another shaft rotatable independently of said first named shaft and of said member attached thereto, said second named shaft provided with a bearing carried by said rotatable member.

2. In a mixing bowl the combination with at least two axially aligned shaft ends of shafts operable at different speeds, of a sleeve for one shaft with means carried by said sleeve providing a bearing for said other shaft.

3. In a mixing bowl the combination with at least two axially aligned shaft ends of shafts operable at different speeds, of a sleeve for one shaft with means carried by said sleeve providing a bearing for said other shaft, said sleeve adapted to be mounted on said carrying shaft after said shaft has been extended within walls of said mixing bowl.

FRANK X. LAUTERBUR.